US012755346B2

(12) United States Patent
Mao et al.

(10) Patent No.: US 12,755,346 B2
(45) Date of Patent: Oct. 6, 2026

(54) IMAGE RESTORATION METHOD AND APPARATUS, DEVICE, MEDIUM AND PRODUCT

(71) Applicant: Beijing Youzhuju Network Technology Co., Ltd., Beijing (CN)

(72) Inventors: Xiaofei Mao, Beijing (CN); Can Huang, Beijing (CN)

(73) Assignee: Beijing Youzhuju Network Technology Co., Ltd., Beijing (CN)

(*) Notice: Subject to any disclaimer, the term of this patent is extended or adjusted under 35 U.S.C. 154(b) by 194 days.

(21) Appl. No.: 18/849,359

(22) PCT Filed: Feb. 27, 2023

(86) PCT No.: PCT/CN2023/078345
§ 371 (c)(1),
(2) Date: Sep. 20, 2024

(87) PCT Pub. No.: WO2023/179310
PCT Pub. Date: Sep. 28, 2023

(65) Prior Publication Data

US 2025/0200711 A1 Jun. 19, 2025

(30) Foreign Application Priority Data

Mar. 21, 2022 (CN) ......................... 202210278129.3

(51) Int. Cl.

| | |
|---|---|
| ***G06T 5/50*** | (2006.01) |
| ***G06F 16/583*** | (2019.01) |
| ***G06T 5/60*** | (2024.01) |

(52) U.S. Cl.
CPC .............. *G06T 5/50* (2013.01); *G06F 16/583* (2019.01); *G06T 5/60* (2024.01); *G06T 2207/20084* (2013.01); *G06T 2207/20221* (2013.01)

(58) Field of Classification Search
CPC ... G06T 5/50; G06T 5/60; G06T 2207/20084; G06T 2207/20221; G06T 2207/20081; G06T 5/00; G06F 16/583; G06F 18/214
See application file for complete search history.

(56) References Cited

U.S. PATENT DOCUMENTS

2002/0041717 A1* 4/2002 Murata ..................... G06T 5/80 382/284
2005/0122400 A1* 6/2005 Kochi ..................... G06T 3/047 348/207.99

(Continued)

FOREIGN PATENT DOCUMENTS

CN 111325704 A 6/2020
CN 113592724 A 11/2021

(Continued)

OTHER PUBLICATIONS

Chinese Search Report for CN Patent Application No. 202210278129.3, Issued on Jun. 17, 2024, 1 page.

(Continued)

*Primary Examiner* — Aaron W Carter

(57) ABSTRACT

The present disclosure provides an image restoration method, a device, a medium. The method includes: acquiring an image to be restored; determining, from an image library, a plurality of similar images of the image to be restored; performing a concat on the image to be restored, the first similar image and the second similar image; inputting a concatenated image into an image restoration model; obtaining a first encoding result by serializing and encoding, based on a first branch of the image restoration model, a feature map extracted from the concatenated image, obtaining a second encoding result by separately encoding feature sub-map sets obtained by segmenting the feature map according to different scales and fully connecting encoding results of feature sub-maps in the feature sub-map sets based (Continued)

on a second branch of the image restoration model; and obtaining a restored image according to the first encoding result and the second encoding result.

20 Claims, 5 Drawing Sheets

(56) References Cited

U.S. PATENT DOCUMENTS

| | | | | |
|---|---|---|---|---|
| 2013/0279809 | A1* | 10/2013 | Dellinger | G06F 16/51 382/195 |
| 2014/0222783 | A1* | 8/2014 | Chang | G06V 20/20 707/722 |
| 2015/0130799 | A1 | 5/2015 | Holzer et al. | |
| 2017/0195654 | A1* | 7/2017 | Powers | G02B 27/30 |
| 2019/0122330 | A1* | 4/2019 | Saget | A61B 17/846 |
| 2020/0051222 | A1* | 2/2020 | Kim | G06T 3/4038 |
| 2020/0219234 | A1* | 7/2020 | Sotodate | G06T 5/50 |
| 2021/0097648 | A1* | 4/2021 | Fang | G06F 18/253 |
| 2023/0098437 | A1* | 3/2023 | Li | G06T 3/4038 382/299 |
| 2023/0316574 | A1* | 10/2023 | Eilat | G06T 7/73 382/154 |
| 2025/0124549 | A1* | 4/2025 | Perrone | G06T 5/50 |
| 2025/0131535 | A1* | 4/2025 | Mao | G06T 5/73 |
| 2025/0200711 | A1* | 6/2025 | Mao | G06T 5/60 |
| 2025/0299304 | A1* | 9/2025 | Park | G06V 20/625 |
| 2025/0363697 | A1* | 11/2025 | Yan | G06T 11/60 |

FOREIGN PATENT DOCUMENTS

| | | | |
|---|---|---|---|
| CN | 113724143 | A | 11/2021 |
| CN | 113870254 | A | 12/2021 |
| CN | 114581336 | A | 6/2022 |
| WO | 2020/248294 | A1 | 12/2020 |

OTHER PUBLICATIONS

International Search Report received for PCT Patent Application No. PCT/CN2023/078345, mailed on May 17, 2023, 5 pages (2 pages of English Translation and 3 pages of Original Document).

Shaojun, "Railway is our country's important transportation facilities, is a major artery of economic development.", Beijing Jiaotong University, 2022, pp. 1-4.

Zamir et al., "Learning Enriched Features for Real Image Restoration and Enhancement", Inception Institute of Articial Intelligence, pp. 1-20. 2020.

* cited by examiner

IMAGE RESTORATION METHOD AND APPARATUS, DEVICE, MEDIUM AND PRODUCT

CROSS-REFERENCE TO RELATED APPLICATION(S)

This application is a U.S. National Stage Application of PCT Application Serial No. PCT/CN2023/078345, filed on Feb. 27, 2023, which claims priority to Chinese Application No. 202210278129.3, filed in the State Intellectual Property Office of China on Mar. 21, 2022, and entitled "Image Restoration Method and Apparatus, Device, Medium and Product", the disclosures of which are incorporated herein by reference in their entireties.

FIELD

The present disclosure belongs to the technical field of image processing, and in particular to an image restoration method and apparatus, a device, a computer-readable storage medium and a computer program product.

BACKGROUND

With the continuous maturity of an image processing technology, requirements of users for performing image restoration via the image processing technology have been gradually enhanced. The image restoration refers to restoring a missing part in an image. Specifically, the image restoration refers to restoring unknown information in the image based on known information in the image.

In a typical image restoration solution, for an image to be restored, a restored area in the image to be restored is determined, a reference area is determined for the restored area, and then a pixel value of the restored area is predicted by a neural network model based on a pixel value of the reference area of the image, thereby implementing image restoration. However, this image restoration technology may lead to distortion situations of the restored area, such as ripples and distortion, and thus failing to meet the requirements of the users for the authenticity of the image restoration.

How to improve the authenticity of the image restoration becomes an urgent problem to be solved.

SUMMARY

The objective of the present disclosure is to provide an image restoration method and apparatus, a device, a computer-readable storage medium and a computer program product, which can perform high-authenticity restoration on an image to be restored, thereby improving the usage experience of a user.

In a first aspect, the present disclosure provides an image restoration method, including: acquiring an image to be restored; determining, from an image library, a plurality of similar images of the image to be restored, wherein the plurality of similar images comprise at least a first similar image and a second similar image; and performing a concat on the image to be restored, the first similar image and the second similar image; inputting a concatenated image into an image restoration model; obtaining a first encoding result by serializing and encoding, based on a first branch of the image restoration model, a feature map extracted from the concatenated image, obtaining a second encoding result by separately encoding feature sub-map sets obtained by segmenting the feature map according to different scales and fully connecting encoding results of feature sub-maps in the feature sub-map sets based on a second branch of the image restoration model; and obtaining a restored image according to the first encoding result and the second encoding result.

In a second aspect, the present disclosure provides an image restoration apparatus, including: an acquisition module, configured to acquire an image to be restored; a determination module, configured to determine, from an image library, a plurality of similar images of the image to be restored, wherein the plurality of similar images include at least a first similar image and a second similar image; and a concat module, configured to perform a concat on the image to be restored, the first similar image and the second similar image; input a concatenated image into an image restoration model; obtain a first encoding result by serializing and encoding, based on a first branch of the image restoration model, a feature map extracted from the concatenated image, obtain a second encoding result by separately encoding feature sub-map sets obtained by segmenting the feature map according to different scales and fully connect encoding results of feature sub-maps in the feature sub-map sets based on a second branch of the image restoration model; and obtain a restored image according to the first encoding result and the second encoding result.

In a third aspect, the present disclosure provides an electronic device, including: a storage apparatus, storing a computer program thereon; and a processing apparatus, configured to execute the computer program in the storage apparatus, so as to implement the steps of the method according to the first aspect of the present disclosure.

In a fourth aspect, the present disclosure provides a computer-readable medium, storing a computer program thereon, wherein the program implements, when executed by a processing apparatus, implements the steps of the method according to the first aspect of the present disclosure.

In a fifth aspect, the present disclosure provides a computer program product, including an instruction that, when running on a device, causes the device to execute the steps of the method according to the first aspect.

It can be seen from the above technical solutions that the present disclosure has at least the following advantages:

In the above technical solutions, an electronic device acquires an image to be restored, and then determines, from an image library, a plurality of similar images of the image to be restored, and the plurality of similar images include a first similar image and the second similar image. The electronic device performs the concat on the image to be restored, the first similar image and the second similar image, and inputs a concatenated image into an image restoration model. The electronic device obtains a first encoding result by serializing and encoding, based on a first branch of the image restoration model, a feature map extracted from the concatenated image. The electronic device obtains a second encoding result by separately encoding feature sub-map sets obtained by segmenting the feature map according to different scales and fully connecting encoding results of feature sub-maps in the feature sub-map sets based on a second branch of the image restoration model. The electronic device obtains a restored image according to the first encoding result and the second encoding result.

On one hand, for image restoration, not only can an area to be restored be predicted based on a known area (a reference area) of the image to be restored, but the similar images can also be used as the known area to predict the area to be restored of the image to be restored. In this way, reliable data for predicting the image of the area to be restored is increased, thereby effectively improving the effect of image restoration. On the other hand, the two branches of the image restoration model may restore the image to be restored based on feature maps of different scales, so that the image restoration is more accurate, the authenticity of the image restoration is improved, and the usage experience of the user is improved.

Other features and advantages of the present disclosure will be described in detail in the following Detailed Description of Embodiments.

BRIEF DESCRIPTION OF THE DRAWINGS

The drawings are used for providing a further understanding of the present invention, constitute a part of the specification, and are used for explaining the present invention together with the embodiments of the present invention, but do not constitute a limitation on the present invention. In the drawings.

DETAILED DESCRIPTION OF EMBODIMENTS

Figure 1:
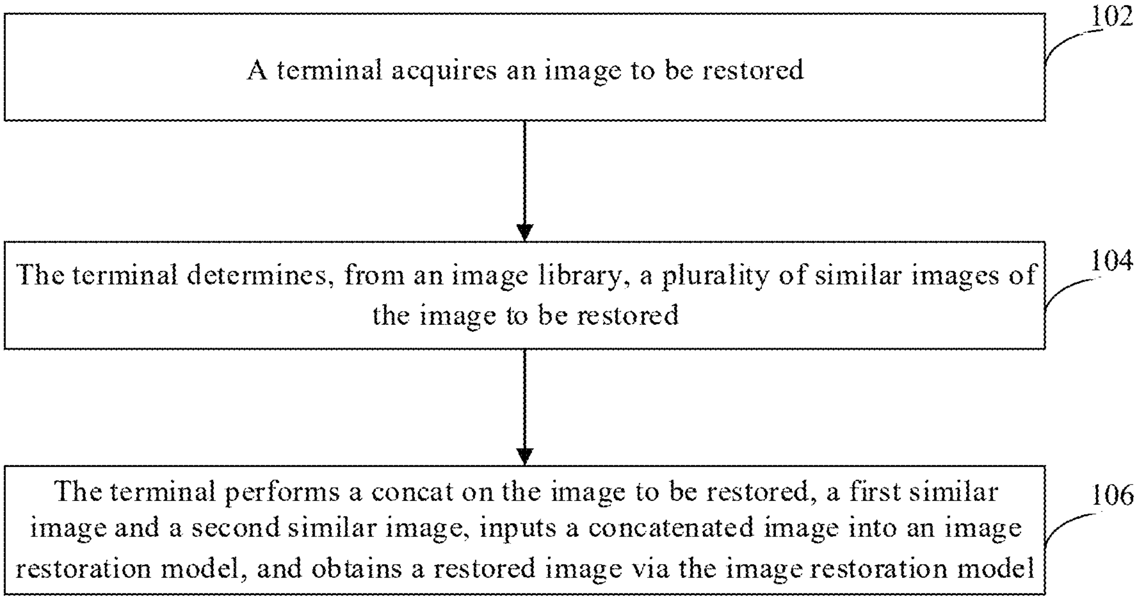
FIG. 1 is a schematic flowchart of an image restoration method provided in an embodiment of the present disclosure.

The terms "first" and "second" in the embodiments of the present disclosure are used for descriptive purposes only and cannot be understood as indicating or implying relative importance or implicitly indicating the number of indicated technical features. Thus, the features defined with "first" and "second" may explicitly or implicitly include one or more of the features.

First, some technical terms involved in the embodiments of the present disclosure are introduced.

An image processing technology is generally to process a digital image, and specifically refers to a technology for analyzing and processing the digital image by a computer. Based on the image processing technology, various types of processing may be performed on the image, for example, an image having a missing part is restored, that is, an image restoration technology.

The image restoration technology refers to determining, for an image to be restored, a restored area and a reference area in the image to be restored, and restoring the restored area based on the reference area. The image to be restored may be an image with a partial missing pattern, and may also be an image whose definition does not meet user requirements.

In general, the employed image restoration technology is to predict, according to a pixel value of the reference area in the image to be restored, a pixel value of a restored area by a neural network model, thereby realizing image restoration. The image restoration method only restores the image from the perspective of pixels, which may cause distortion situations of the restored area, such as ripples and distortion. Moreover, when there is a relatively large partial missing pattern in the image to be restored, the method cannot accurately determine the missing content, and thus cannot meet the requirements of the user for the authenticity of the image restoration.

In view of this, the present disclosure provides an image restoration method, which is applied to an electronic device. The electronic device refers to a device having a data processing capability, for example, may be a server or a terminal. The terminal includes, but is not limited to, a smart phone, a tablet computer, a notebook computer, a personal digital assistant (PDA), or a smart wearable device, etc. The server may be a cloud server, for example, a central server in a central cloud computing cluster, or an edge server in an edge cloud computing cluster. Of course, the server may also be a server in a local data center. The local data center refers to a data center directly controlled by a user.

Specifically, the electronic device acquires an image to be restored, then determines, from an image library, a plurality of similar images of the image to be restored, and performs the concat on the image to be restored, a first similar image and a second similar image. The electronic device inputs a concatenated image into an image restoration model, and obtains a first encoding result by serializing and encoding, based on a first branch of the image restoration model, a feature map extracted from the concatenated image. Then, the electronic device obtains a second encoding result by separately encoding feature sub-map sets obtained by segmenting the feature map according to different scales and fully connecting encoding results of feature sub-maps in the feature sub-map sets based on a second branch of the image restoration model. The electronic device obtains a restored image according to the first encoding result and the second encoding result.

On one hand, for image restoration, not only can an area to be restored be predicted based on a known area (a reference area) of the image to be restored, but the similar images can also be used as the known area to predict the area to be restored of the image to be restored. In this way, reliable data for predicting the image of the area to be restored is increased, thereby effectively improving the effect of image restoration. On the other hand, the two branches of the image restoration model may restore the image to be restored based on feature maps of different scales, so that the image restoration is more accurate, the authenticity of the image restoration is improved, and the usage experience of the user is improved.

In order to make the technical solutions of the present disclosure clearer and understandable, the image restoration method provided in the embodiments of the present disclosure will be described below by taking it as an example that the electronic device is a terminal, as shown in FIG. 1, and the method includes the following steps:

S102: the terminal acquires an image to be restored.

Figure 2:
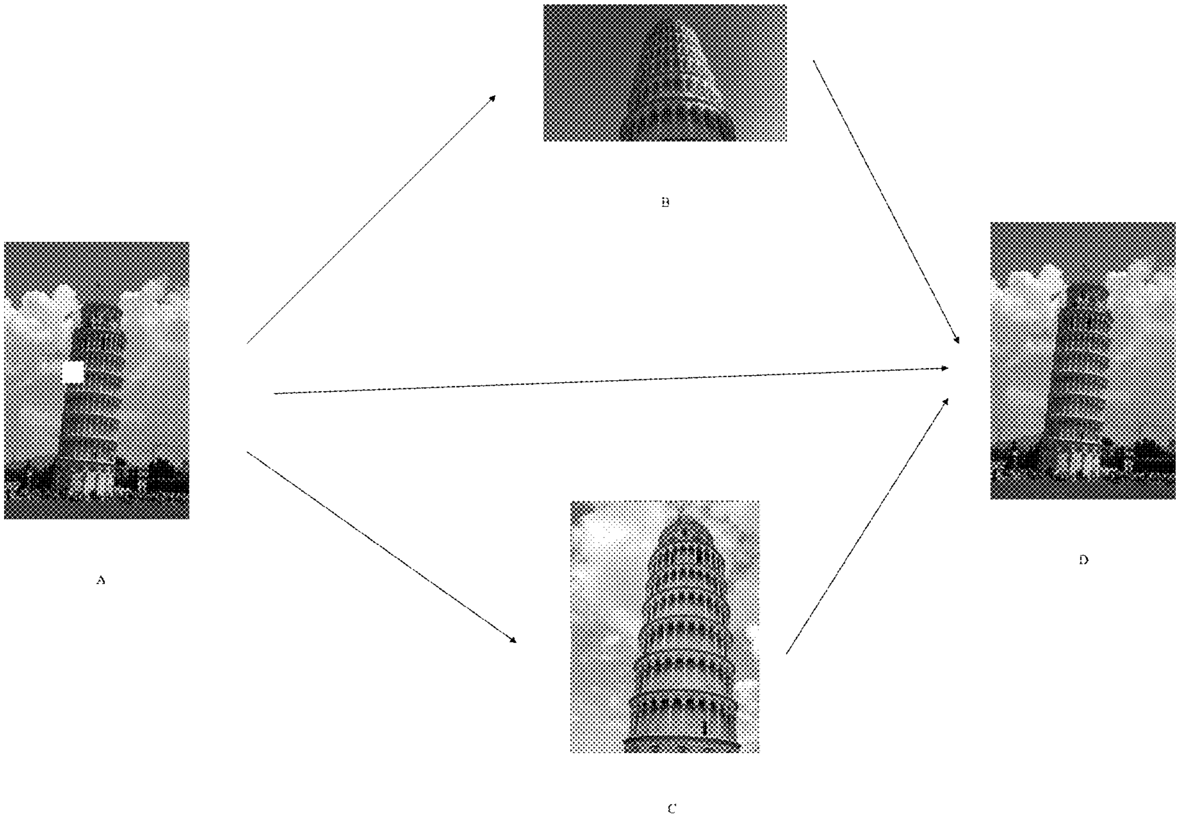
FIG. 2 is a schematic diagram of image restoration provided in an embodiment of the present disclosure.

The image to be restored may be a partially missing image, and may also be an image whose definition does not meet the requirements of the user. Referring to FIG. 2, FIG.

2 is a schematic diagram of image restoration provided in an embodiment of the present disclosure. In the present embodiment, it is taken as an example for introduction that the image to be restored is a partially missing image, and as shown in A in FIG. 2, there is a blank (missing) in a top left part of the image.

The terminal may acquire the image to be restored in a plurality of ways, and in some possible implementations, the terminal may capture the image to be restored via a camera. For example, if the user has a paper photo of which a part is missing, the user may photograph the paper photo via the camera to obtain an image to be restored in a digital format. In some other possible implementations, the terminal may acquire the image to be restored via an input operation of the user on a corresponding interface. For example, the user stores the image to be restored in the digital format in other terminals, therefore the image to be restored may be transmitted to the terminal in any transmission mode, so that the terminal acquires the image to be restored.

S104: the terminal determines, from an image library, a plurality of similar images of the image to be restored.

A large number of images are stored in the image library. The terminal may search for, according to the image to be restored and from the image library, a plurality of similar images similar to the image to be restored. The plurality of similar images include a first similar image and a second similar image.

In some possible implementations, the plurality of similar images and the image to be restored each are images of the same subject at different moments or at different perspectives. For example, the image to be restored is a photographed image of a certain building, and the terminal may acquire, from the image library, other similar images in which image subjects are this building. The similar images and the image to be restored may only have differences in aspects of photographing perspectives, photographing distance, light and the like, and thus the similar images may be used as reference data for restoring the image to be restored. In some other possible implementations, the plurality of similar images and the image to be restored are images having the same photographing location.

As shown in FIG. 2, an image to be restored A is an image of a building, and a plurality of similar images B and C determined for the image to be restored A may be images of the building at different times and under different illumination intensities.

The terminal may determine, from the image library and in a plurality of manners, a plurality of similar images of the image to be restored. In some possible implementations, a parameter of the image includes a photographing location of the image. The terminal may acquire, according to the photographing location and from the image library, images photographed at the same location, and then determine, by comparing the similarity between the images photographed at the same location and the image to be restored, whether the images photographed at the same location are similar images. For example, the image to be restored is an image of a certain famous building, which is photographed in front of the famous building. Therefore, other images also photographed at the location may be acquired from the image library, then it is compared whether the other images are similar to the image to be restored, and if so, the other images may be determined as similar images of the image to be restored.

In some other possible implementations, a parameter of the image includes a photographing time of the image. The terminal may acquire, according to the photographing time and from the image library, images photographed at the same time; and then determine, by comparing the similarity between the images photographed at the same time and the image to be restored, whether the images photographed at the same time are similar images. For example, the image to be restored is an image of a sky photographed during a meteor shower. Therefore, other images of the sky, which are photographed at the same moment, may be obtained from the image library, then it is compared whether the other images are similar to the image to be restored, and if so, the other images are determined as similar images of the image to be restored.

Figure 3:
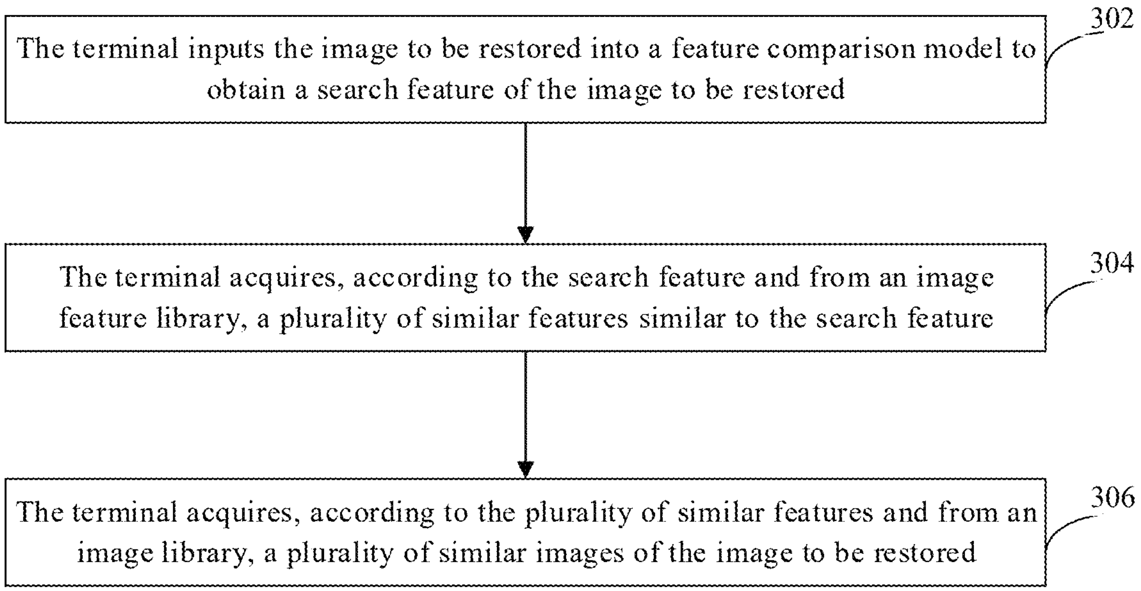
FIG. 3 is a schematic flowchart of acquiring similar images via a neural network model provided in an embodiment of the present disclosure.

The terminal may also determine, from the image library by using a neural network model, a plurality of similar images of the image to be restored. Referring to FIG. 3, FIG. 3 is a schematic flowchart of acquiring similar images via a neural network model provided in an embodiment of the present disclosure. As shown in FIG. 3, the method for determining, from an image library and by using a neural network model, a plurality of similar images of an image to be restored includes the following steps:

S302: the terminal inputs the image to be restored into a feature comparison model to obtain a search feature of the image to be restored.

The feature comparison model is used for determining, from the image to be restored, a search feature for searching in the image library. The search feature is a feature of the image to be restored required for searching for the similar images. The feature comparison model is a trained neural network model. Search is performed in an image feature library via the search feature output by the feature comparison model, similar features corresponding to the similar images similar to the image to be restored may be acquired to determine the similar images.

Specifically, the feature comparison model may use a convolutional neural network (CNN) to perform 4-fold down-sampling on the image to be restored, so as to obtain a feature map of $\frac{1}{16}$ of an original image size. After the feature map is flattened and converted into a one-dimensional sequence, the feature map is sent to N layers of encoder for encoding to obtain an encoded one-dimensional sequence, and then the encoded one-dimensional sequence is converted into a two-dimensional feature to obtain the search feature of the image to be restored.

S304: the terminal acquires, according to the search feature and from an image feature library, a plurality of similar features similar to the search feature.

The image feature library is a feature library in one-to-one correspondence with the image library, and images in the image library are in one-to-one correspondence with features in the image feature library. The feature comparison model is a feature comparison model obtained by the neural network model training a large number of similar images, and a plurality of similar features similar to the search feature may be obtained from the image feature library via the search feature output by the feature comparison model.

S306: the terminal acquires, according to the plurality of similar features and from an image library, a plurality of similar images of the image to be restored.

Since the image library is in one-to-one correspondence with the image feature library, the terminal may determine, according to the similar features and from the image library, the plurality of similar images of the image to be restored.

In this way, the terminal may determine, from the image library and by using the neural network model, the plurality of similar images of the image to be restored, so as to obtain more reference data for image restoration.

In general, image restoration only uses the reference area in the image as known data to determine unknown data of the restored area. However, in the present disclosure, the similar images of the image to be restored are determined, and the similar images are also used as the known data to determine the unknown data of the repair area, so that the data volume of the known data is effectively increased, and thus a better restoration effect can be obtained.

S106: the terminal perform the concat on the image to be restored, a first similar image and a second similar image, inputs a concatenated image into the image restoration model, and then obtains a restored image via the image restoration model.

Figure 4:
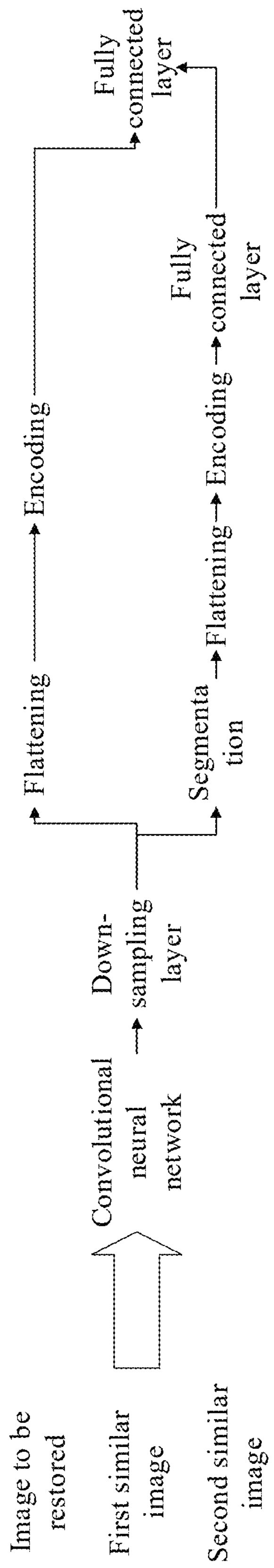
FIG. 4 is a schematic diagram of performing image restoration via an image restoration model provided in an embodiment of the present disclosure.

The terminal performs the concat on the image to be restored and the plurality of similar images to obtain the concatenated image. The plurality of similar images may include the first similar image and the second similar image. Referring to FIG. 4, FIG. 4 is a schematic diagram of performing image restoration via an image restoration model provided in an embodiment of the present disclosure. In the present embodiment, it is taken as an example for introduction that the plurality of similar images include the first similar image and the second similar image, as shown in FIG. 4.

The terminal first performs, by using the image restoration model, 8-fold down-sampling on the concatenated image via the four layers of convolutional neural network (CNN), and then performs 2-fold down-sampling by using a down-sampling layer to obtain a feature map of 1/256 of the original image size.

The image restoration model includes two branches. The first branch flattens the feature map to obtain a one-dimensional sequence, and then inputs the one-dimensional sequence into the N layers of encoder for encoding to obtain a first encoding result. The second branch segments the feature map in different scales. For example, the second branch segments the feature map by using windows of 1/4, 1/16 and 1/64 of the feature map to generate feature sub-map sets; then, the second branch separately flattens feature maps in sub-feature sets to obtain corresponding one-dimensional sequences; the second branch separately inputs these one-dimensional sequences into the N layers of encoder for encoding. and then maps the sequences of different scales, which are output by the encoder, back to the same length by using a fully connected (FC) layer to obtain a second encoding result; and finally; the second branch performs the concat on the first encoding result and the second encoding result via the FC layer to obtain a final output. Therefore, the restoration of the image to be restored is realized.

Since the image restoration model has two branches, and the feature map is segmented in different scales in the second branch, the image to be restored may be restored based on a plurality of feature maps of different scales, so that the image restoration is more accurate, the authenticity of the image restoration is improved, and the usage experience of the user is improved.

The image restoration model may be trained and obtained based on a training image including a plurality of similar images. The plurality of similar images include a mask image, and the mask image is obtained by masking the similar images. The training process of the image restoration model specifically includes the following:

The terminal acquires a training feature map from the training image including the plurality of similar images. Specifically, the terminal performs the concat on the plurality of similar images, firstly performs 8-fold down-sampling on the concatenated image via the 4 layers of convolutional neural network, and then performs 2-fold down-sampling by using the down-sampling layer to obtain a training feature map of 1/256 of the original image size.

The training feature map is flattened by the first branch of the image restoration model to obtain a one-dimensional sequence, and then the one-dimensional sequence is input into the N layers of encoder for encoding to obtain a first training encoding result. By using the second branch of the image restoration model, the training feature map is segmented in different scales by using windows of 1/4, 1/16 and 1/64 of the training feature map, so as to generate training feature sub-map sets. Then, training feature maps in the training feature sub-map sets are separately flattened to obtain corresponding one-dimensional sequences. These one-dimensional sequences are separately input into the N layers of encoder for encoding, and sequences of different scales output by the encoders are mapped back to the same length via the FC layer to obtain a second training encoding result. Finally, the first training encoding result and the second training encoding result are concatenated by the FC layer to obtain a final output. Therefore, the restoration of the mask image is realized. The terminal may compare the restored mask image with the training image prior to masking, so as to update a parameter of the image restoration model.

In the present embodiment, the terminal for executing the image restoration method and the terminal for performing model training in this embodiment may be the same terminal, and may also be different terminals. In some possible implementations, the terminal may transmit the trained image restoration model to a plurality of other terminals, so that the plurality of other terminals can directly use the image restoration model to implement the image restoration method in the present disclosure.

Based on the description of the above content, the present disclosure provides an image restoration method. The terminal acquires the image to be restored, and then determines, from the image library, the plurality of similar images of the image to be restored. The terminal performs the concat on the image to be restored and the plurality of similar images, and inputs the concatenated image into the image restoration model. The terminal serializes and encodes, by using the first branch of the image restoration model, the feature map extracted from the concatenated image, so as to obtain the first encoding result. By using the second branch of the image restoration model, the terminal separately encodes the feature sub-map sets obtained by segmenting the feature map according to different scales, and fully connects the encoding results of the feature sub-maps in the feature sub-map sets, so as to obtain the second encoding result. The terminal obtains the restored image according to the first encoding result and the second encoding result.

In this way, on one hand, in the image restoration by the terminal, not only can the area to be restored be predicted based on the known area (the reference area) of the image to be restored, but the similar images can also be used as the known area to predict the area to be restored of the image to be restored. In this way, reliable data for predicting the image of the area to be restored is increased, thereby effectively improving the effect of image restoration. On the other hand, the two branches of the image restoration model may restore the image to be restored based on the feature maps of different scales, so that the image restoration is more accurate, the authenticity of the image restoration is improved, and the usage experience of the user is improved.

Figure 5:
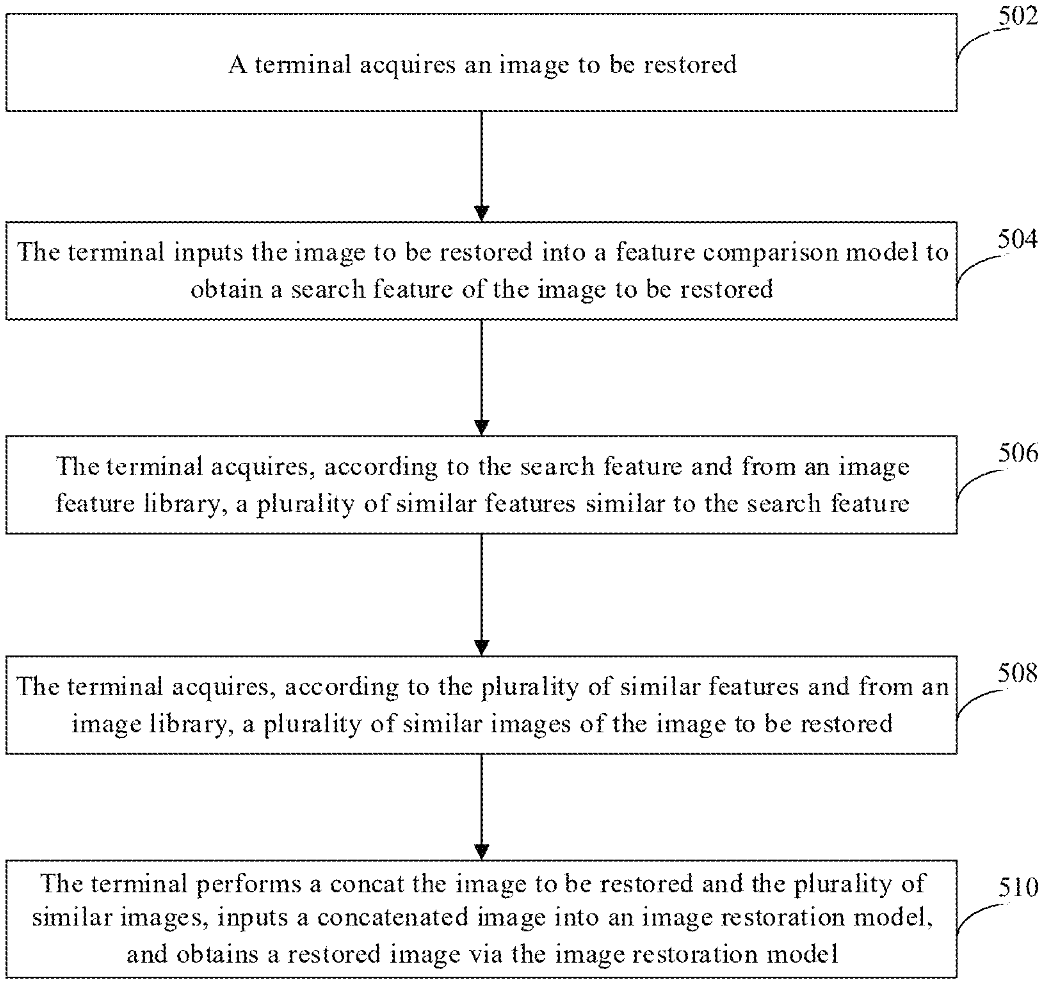
FIG. 5 is a schematic flowchart of another image restoration method provided in an embodiment of the present disclosure.

In some possible implementations, the subject of the image to be restored is a certain famous building, and as shown in FIG. 2, there is a missing top right part in the image. Referring to FIG. 5, FIG. 5 is a schematic flowchart of another image restoration method provided in an embodiment of the present disclosure. As shown in FIG. 5, the restoration of the image to be restored includes the following steps:

S502: a terminal acquires an image to be restored.

The image to be restored in the present embodiment is shown in FIG. 2, and the terminal may convert a papery image to be restored into a digital image to be restored by photographing, and may also directly acquire the digital image to be restored.

S504: the terminal inputs the image to be restored into a feature comparison model to obtain a search feature of the image to be restored.

The feature comparison model may use a convolutional neural network to perform 4-fold down-sampling on the image to be restored, so as to obtain a feature map of 1/16 of an original image size. Then, the feature map is flattened into a one-dimensional sequence, and the one-dimensional sequence is sent to the N layers of encoder for encoding to obtain an encoded one-dimensional sequence. The encoded one-dimensional sequence is converted into a two-dimensional feature to obtain the search feature of the image to be restored.

S506: the terminal acquires, according to the search feature and from an image feature library, similar features similar to the search feature.

The terminal acquires, according to the search feature and from the image feature library in one-to-one correspondence with the image library, a plurality of similar features similar to the search feature.

S508: the terminal acquires, according to the plurality of similar features and from an image library, a plurality of similar images of the image to be restored.

Since features in the image feature library are in one-to-one correspondence with images in the image library, the terminal may determine, according to the plurality of similar features and from the image library, similar images respectively corresponding to the plurality of similar features, so that a plurality of similar images of the image to be restored can be acquired.

S510: the terminal performs the concat on the image to be restored and the plurality of similar images, inputs a concatenated image into an image restoration model, and obtains a restored image via the image restoration model.

Specifically, the terminal performs the concat on the image to be restored and the plurality of similar images to obtain the concatenated image. Then, by using the image restoration model, the terminal firstly performs 8-fold down-sampling on the concatenated image via the 4 layers of convolutional neural network, and then performs 2-fold down-sampling by using a down-sampling layer to obtain a feature map of 1/256 of the original image size.

Further, the terminal flattens the feature map by a first branch of the image restoration model to obtain a one-dimensional sequence, and then inputs the one-dimensional sequence into the N layers of encoder for encoding to obtain a first encoding result.

Moreover, by using a second branch of the image restoration model, the terminal segments the feature map in different scales by using windows of 1/4, 1/16 and 1/64 of the feature map, so as to generate feature sub-map sets. Then, the terminal separately flattens feature maps in the feature sub-map sets to obtain respectively corresponding one-dimensional sequences. The terminal separately inputs these one-dimensional sequences into the N layers of encoder for encoding, and maps sequences of different scales, which are output by the encoders, back to the same length via a fully connected layer to obtain a second encoding result. The respective processing on the feature map via the first branch and the second branch of the model may be performed at the same time.

Finally, the terminal performs the concat on the first encoding result and the second encoding result via the FC layer to obtain a final output. Therefore, the restoration of the image to be restored is realized.

In some possible implementations, the image to be restored may be as shown in A in FIG. 2, the similar images of the image to be restored may be as shown in B and C in FIG. 2, B is a first similar image, C is a second similar image, and D in FIG. 2 is a repaired image. Since the reference data in a restoration process includes not only the known part of A, but also the similar images B and C, more reference data is provided, so that the restoration can be performed more accurately.

Figure 6:
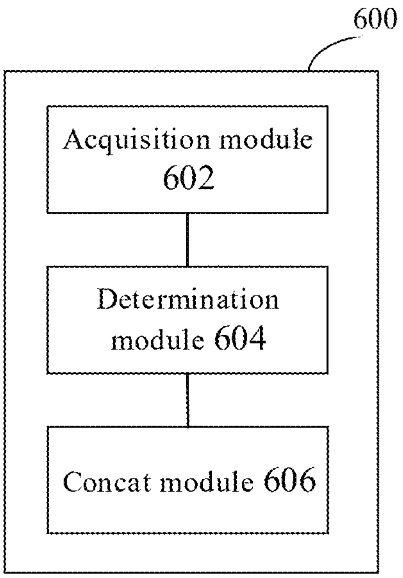
FIG. 6 is a schematic structural diagram of an image restoration apparatus provided in an embodiment of the present disclosure.

FIG. 6 is a schematic structural diagram of an image restoration apparatus provided in an embodiment of the present disclosure, and as shown in FIG. 6, the image restoration apparatus 600 includes: an acquisition module 602, configured to acquire an image to be restored; a determination module 604, configured to determine, from an image library, a plurality of similar images of the image to be restored, wherein the plurality of similar images include at least a first similar image and a second similar image; and a concat module 606, configured to perform a concat on the image to be restored, the first similar image and the second similar image; input a concatenated image into an image restoration model; obtain a first encoding result by serializing and encoding, based on a first branch of the image restoration model, a feature map extracted from the concatenated image, obtain a second encoding result by separately encoding feature sub-map sets obtained by segmenting the feature map according to different scales and fully connecting encoding results of feature sub-maps in the feature sub-map sets based on a second branch of the image restoration model; and obtain a restored image according to the first encoding result and the second encoding result.

Optionally, the image restoration model is trained and obtained based on training images, the training images comprise a plurality of similar images, the plurality of similar images include a mask image, and the mask image is obtained by masking the similar images.

Optionally, the image restoration model is trained and obtained the following manner: extracting a training feature map from the training image; obtaining a first training encoding result by serializing and encoding the training feature map based on the first branch of the image restoration model; obtaining a second training encoding result by separately encoding training feature sub-map sets obtained by segmenting the training feature map according to different scales and fully connecting encoding results of training feature sub-maps in the training feature sub-map sets based on the second branch of the image restoration model; restoring the mask image according to the first training encoding result and the second training encoding result; and updating a parameter of the image restoration model according to the restored mask image and the training image prior to masking.

Optionally, the determination module 604 may be configured to: obtain a search feature of the image to be restored by inputting the image to be restored into a feature comparison model; acquire, according to the search feature and from an image feature library, a plurality of similar features similar to the search feature; and acquire, according to the plurality of similar features and from the image library, the plurality of similar images of the image to be restored, wherein images in the image library are in one-to-one correspondence with features in the image feature library.

Optionally, the determination module 604 is specifically configured to: input the image to be restored into the feature comparison model, obtain a feature map of the image to be restored by down-sampling the image to be restored based on the feature comparison model, and obtain the search feature of the image to be restored by encoding the feature map.

Optionally, the plurality of similar images and the image to be restored each are images of the same subject at different moments or at different angles.

Optionally, the plurality of similar images and the image to be restored are images having the same photographing location.

Functions of the above modules have been described in detail in the steps of the method in the foregoing embodiment, and thus details are not described herein again.

Hereinafter, referring to FIG. 7, it illustrates a schematic structural diagram of an electronic device 700 suitable for implementing the embodiments of the present application. The terminal device in the embodiments of the present disclosure may include, but is not limited to, mobile terminals such as mobile phones, notebook computers, digital broadcast receivers, PDAs (personal digital assistants), PADs (portable Android devices), PMPs (portable media players), vehicle-mounted terminals (e.g., vehicle-mounted navigation terminals), and the like, and fixed terminals such as digital TVs, desktop computers, and the like. The electronic device shown in FIG. 7 is merely an example, and should not bring any limitation to the functions and use ranges of the embodiments of the present disclosure.

Figure 7:
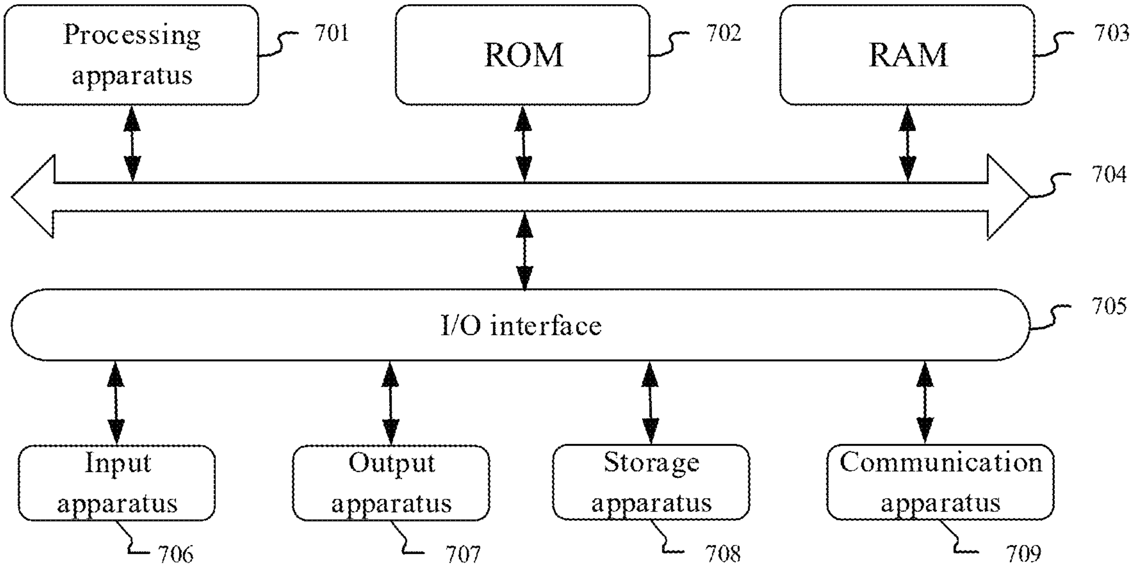
FIG. 7 is a schematic structural diagram of an electronic device provided in an embodiment of the present disclosure.

As shown in FIG. 7, the electronic device 700 may include a processing apparatus (e.g., a central processing unit, a graphics processing unit, or the like) 701, which may execute various suitable actions and processes according to a program stored in a read-only memory (ROM) 702 or a program loaded from a storage apparatus 708 into a random access memory (RAM) 703. In the RAM 703, various programs and data needed by the operations of the electronic device 700 are also stored. The processing apparatus 701, the ROM 702 and the RAM 703 are connected with each other via a bus 704. An input/output (I/O) interface 705 is also connected to the bus 704.

In general, the following apparatuses may be connected to the I/O interface 705: an input apparatus 706, including, for example, a touch screen, a touch pad, a keyboard, a mouse, a camera, a microphone, an accelerometer, a gyroscope, and the like; an output apparatus 707, including, for example, a liquid crystal display (LCD), a speaker, a vibrator, and the like; a storage apparatus 708, including, for example, a magnetic tape, a hard disk, and the like; and a communication apparatus 709. The communication apparatus 709 may allow the electronic device 700 to communicate in a wireless or wired manner with other devices to exchange data. Although FIG. 7 illustrates the electronic device 700 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a non-transitory computer-readable medium, and the computer program contains program codes for executing the method illustrated in the flowcharts. In such embodiments, the computer program may be downloaded and installed from a network via the communication apparatus 709, or installed from the storage apparatus 708, or installed from the ROM 702. When the computer program is executed by the processing apparatus 701, the above functions defined in the method provided in the embodiments of the present disclosure are executed.

It should be noted that, the computer-readable medium described above in the present disclosure may be either a computer-readable signal medium or a computer-readable storage medium, or any combination of the two. The computer-readable storage medium may be, for example, but is not limited to, an electrical, magnetic, optical, electromagnetic, infrared, or semiconductor system, apparatus or device, or a combination of any of the above, More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disc read-only memory (CD-ROM), an optical storage device, a magnetic storage device, or any suitable combination of the above. In the present disclosure, the computer-readable storage medium may be any tangible medium that contains or stores a program, wherein the program may be used by or in combination with an instruction execution system, apparatus or device. In the present disclosure, the computer-readable signal medium may include a data signal that is propagated in a baseband or used as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in combination with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

In some implementations, a client and a server may perform communication by using any currently known or future-developed network protocol, such as an HTTP (HyperText Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., an ad hoc peer-to-peer network), as well as any currently known or future-developed network.

The computer-readable medium may be contained in the above electronic device; and it may also be present separately and is not assembled into the electronic device.

The computer-readable medium carries one or more programs that, when executed by the electronic device, cause the electronic device to: perform text detection on an image to obtain a text area in the image, wherein the text area includes a plurality of text rows; construct a graph network model according to the text area, wherein each text row in the text area is one node of the graph network model; classify nodes in the graph network model via a node classification model, and classify edges between the nodes in the graph network model via an edge classification model; and obtain at least one key value pair in the image according to a classification result of the nodes and a classification result of the edges. Computer program codes for executing the operations of the present disclosure may be written in one or more programming languages or combinations thereof. The programming languages include, but are not limited to, object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or the server. In the case involving the remote computer, the remote computer may be connected to the user computer through any type of network, including a local area network (LAN for short) or a wide area network (WAN for short), or it may be connected to an external computer (e.g., through the Internet using an Internet service provider).

The flowcharts and block diagrams in the drawings illustrate system architectures, functions and operations of possible implementations of systems, methods and computer program products according to various embodiments of the present disclosure. In this regard, each block in the flowcharts or block diagrams may represent a part of a module, a program segment or a code, and the part of the module, the program segment or the code contains one or more executable instructions for implementing specified logic functions. It should also be noted that, in some alternative implementations, the functions annotated in the blocks may occur out of the sequence annotated in the drawings. For example, two blocks shown in succession may, in fact, be executed substantially concurrently, or the blocks may sometimes be executed in a reverse sequence, depending upon the functions involved. It should also be noted that each block in the block diagrams and/or flowcharts, and combinations of the blocks in the block diagrams and/or flowcharts may be implemented by dedicated hardware-based systems for executing specified functions or operations, or combinations of dedicated hardware and computer instructions.

The modules involved in the described embodiments of the present disclosure may be implemented in a software or hardware manner. The names of the modules do not constitute limitations of the modules themselves in a certain case.

The functions described herein above may be executed, at least in part, by one or more hardware logic components. For example, without limitation, example types of the hardware logic components that may be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc read-only memory (CD-ROM), an optical storage device, a magnetic storage device, or any suitable combination thereof.

According to one or more embodiments of the present disclosure, example 1 provides an image restoration method, including: acquiring an image to be restored; determining, from an image library, a plurality of similar images of the image to be restored, wherein the plurality of similar images include at least a first similar image and a second similar image; fusing the image to be restored, the first similar image and the second similar image, and inputting a concatenated image into an image restoration model; serializing and encoding, by using a first branch of the image restoration model, a feature map extracted from the concatenated image, so as to obtain a first encoding result; by using a second branch of the image restoration model, respectively encoding feature sub-map sets obtained by segmenting the feature map according to different scales, and fully connecting encoding results of feature sub-maps in the feature sub-map sets, so as to obtain a second encoding result; and obtaining a restored image according to the first encoding result and the second encoding result.

According to one or more embodiments of the present disclosure, example 2 provides the method in example 1, the image restoration model is trained and obtained based on a training image, the training image includes a plurality of similar images, the plurality of similar images include a mask image, and the mask image is obtained by masking the similar images.

According to one or more embodiments of the present disclosure, example 3 provides the method in example 2, the image restoration model is trained and obtained the following manner; extracting a training feature map from the training image; serializing and encoding the training feature map by using the first branch of the image restoration model, so as to obtain a first training encoding result; by using the second branch of the image restoration model, respectively encoding training feature sub-map sets obtained by segmenting the training feature map according to different scales, and fully connecting encoding results of training feature sub-maps in the training feature sub-map sets, so as to obtain a second training encoding result; restoring the mask image according to the first training encoding result and the second training encoding result; and updating a parameter of the image restoration model according to the restored mask image and the training image prior to masking.

According to one or more embodiments of the present disclosure, example 4 provides the method in example 1, determining, from the image library, the plurality of similar images of the image to be restored, includes: obtaining a search feature of the image to be restored by inputting the image to be restored into a feature comparison model; acquiring, according to the search feature and from an image feature library, a plurality of similar features similar to the search feature; and acquiring, according to the plurality of similar features and from the image library, the plurality of similar images of the image to be restored, wherein images in the image library are in one-to-one correspondence with features in the image feature library.

According to one or more embodiments of the present disclosure, example 5 provides the method in example 4, obtaining the search feature of the image to be restored by inputting the image to be restored into the feature comparison model, includes: inputting the image to be restored into the feature comparison model, obtaining a feature map of the image to be restored by down-sampling the image to be restored based on the feature comparison model, and obtaining the search feature of the image to be restored by encoding the feature map.

According to one or more embodiments of the present disclosure, example 6 provides the method in any one of example 1 to example 5, the plurality of similar images and the image to be restored each are images of the same subject at different moments or at different angles.

According to one or more embodiments of the present disclosure, example 7 provides the method in any one of example 1 to example 6, the plurality of similar images and the image to be restored are images having the same photographing location.

According to one or more embodiments of the present disclosure, example 8 provides an image restoration apparatus, including: an acquisition module, configured to acquire an image to be restored; a determination module, configured to determine, from an image library, a plurality of similar images of the image to be restored, wherein the plurality of similar images comprise at least a first similar image and a second similar image; and a concat module, configured to perform the concat on the image to be restored, the first similar image and the second similar image; input a concatenated image into an image restoration model; serialize and encode, by using a first branch of the image restoration model, a feature map extracted from the concatenated image, so as to obtain a first encoding result; by using a second branch of the image restoration model, respectively encode feature sub-map sets obtained by segmenting the feature map according to different scales, and fully connect encoding results of feature sub-maps in the feature sub-map sets, so as to obtain a second encoding result; and obtain a restored image according to the first encoding result and the second encoding result.

According to one or more embodiments of the present disclosure, example 9 provides the apparatus of example 8, the image restoration model is trained and obtained based on a training image, the training image includes a plurality of similar images, the plurality of similar images include a mask image, and the mask image is obtained by masking the similar images.

According to one or more embodiments of the present disclosure, example 10 provides the apparatus of example 9, the image restoration model is trained and obtained in the following manner; extracting a training feature map from the training image; serializing and encoding the training feature map by using the first branch of the image restoration model, so as to obtain a first training encoding result; by using the second branch of the image restoration model, respectively encoding training feature sub-map sets obtained by segmenting the training feature map according to different scales, and fully connecting encoding results of training feature sub-maps in the training feature sub-map sets, so as to obtain a second training encoding result; restoring the mask image according to the first training encoding result and the second training encoding result; and updating a parameter of the image restoration model according to the restored mask image and the training image prior to masking.

According to one or more embodiments of the present disclosure, example 11 provides the apparatus of example 8, the determination module is specifically configured to: obtain a search feature of the image to be restored by inputting the image to be restored into a feature comparison model; acquire, according to the search feature and from an image feature library, a plurality of similar features similar to the search feature; and acquire, according to the plurality of similar features and from the image library, the plurality of similar images of the image to be restored, wherein images in the image library are in one-to-one correspondence with features in the image feature library.

According to one or more embodiments of the present disclosure, example 12 provides the apparatus of example 11, the determination module is specifically configured to: input the image to be restored into the feature comparison model, obtain a feature map of the image to be restored by down-sampling the image to be restored based on the feature comparison model, and obtain the search feature of the image to be restored by encoding the feature map of the image to be restored based on the feature comparison model.

According to one or more embodiments of the present disclosure, example 13 provides the apparatus in any one of example 8 to example 12, the plurality of similar images and the image to be restored each are images of the same subject at different moments or at different angles.

According to one or more embodiments of the present disclosure, example 14 provides the apparatus in any one of example 8 to example 12, the plurality of similar images and the image to be restored are images having the same photographing location.

What have been described above are only preferred embodiments of the present disclosure and illustrations of the technical principles employed. It should be understood by those skilled in the art that, the disclosure scope involved in the preset disclosure is not limited to the technical solutions formed by specific combinations of the above technical features, and meanwhile should also include other technical solutions formed by any combinations of the above technical features or equivalent features thereof without departing from the concept of the disclosure, for example, technical solutions formed by mutual replacement of the above features with technical features having similar functions disclosed in the present disclosure (but is not limited to).

In addition, although various operations are described in a particular order, this should not be understood as requiring that these operations are executed in the particular sequence shown or in a sequential order. In certain environments, multitasking and parallel processing may be advantageous. Similarly, although several specific implementation details have been contained in the above discussion, these should not be construed as limiting the scope of the present disclosure. Some features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms of implementing the claims. Regarding the apparatus in the above embodiments, the specific manner in which each module executes operations have been described in detail in the embodiments related to the method, and thus details are not repeated herein again.

We claim:

1. An image restoration method, comprising:

acquiring an image to be restored;

determining, from an image library, a plurality of similar images of the image to be restored, wherein the plurality of similar images comprise at least a first similar image and a second similar image; and performing a concat on the image to be restored, the first similar image and the second similar image; inputting a concatenated image into an image restoration model; obtaining a first encoding result by serializing and encoding, based on a first branch of the image restoration model, a feature map extracted from the concatenated image, obtaining a second encoding result by separately encoding feature sub-map sets obtained by segmenting the feature map according to different scales and fully connecting encoding results of feature sub-maps in the feature sub-map sets based on a second branch of the image restoration model; and obtaining a restored image according to the first encoding result and the second encoding result.

2. The method according to claim 1, wherein the image restoration model is trained and obtained based on training images, the training images comprise a plurality of similar images, the plurality of similar images comprise a mask image, and the mask image is obtained by masking the similar images.

3. The method according to claim 2, wherein the image restoration model is trained and obtained by:

extracting a training feature map from the training image;

obtaining a first training encoding result by serializing and encoding the training feature map based on the first branch of the image restoration model;

obtaining a second training encoding result by separately encoding training feature sub-map sets obtained by segmenting the training feature map according to different scales and fully connecting encoding results of training feature sub-maps in the training feature sub-map sets based on the second branch of the image restoration model;

restoring the mask image according to the first training encoding result and the second training encoding result; and updating a parameter of the image restoration model according to the restored mask image and the training image prior to masking.

4. The method according to claim 1, wherein determining, from the image library, the plurality of similar images of the image to be restored, comprises:

obtaining a search feature of the image to be restored by inputting the image to be restored into a feature comparison model;

acquiring, according to the search feature and from an image feature library, a plurality of similar features similar to the search feature; and acquiring, according to the plurality of similar features and from the image library, the plurality of similar images of the image to be restored, wherein images in the image library are in one-to-one correspondence with features in the image feature library.

5. The method according to claim 4, wherein obtaining the search feature of the image to be restored by inputting the image to be restored into the feature comparison model, comprises:

inputting the image to be restored into the feature comparison model, obtaining a feature map of the image to be restored by down-sampling the image to be restored based on the feature comparison model, and obtaining the search feature of the image to be restored by encoding the feature map of the image to be restored based on the feature comparison model.

6. The method according to claim 1, wherein the plurality of similar images and the image to be restored each are images of a same subject at different moments or at different perspectives.

7. The method according to claim 1, wherein the plurality of similar images and the image to be restored are images having a same photographing location.

8. A device, comprising a processor and a memory, wherein the processor is configured to execute an instruction stored in the memory, to cause the device to:

acquire an image to be restored;

determine, from an image library, a plurality of similar images of the image to be restored, wherein the plurality of similar images comprise at least a first similar image and a second similar image; and perform a concat on the image to be restored, the first similar image and the second similar image; input a concatenated image into an image restoration model; obtain a first encoding result by serializing and encoding, based on a first branch of the image restoration model, a feature map extracted from the concatenated image; obtain a second encoding result by separately encoding feature sub-map sets obtained by segmenting the feature map according to different scales and fully connecting encoding results of feature sub-maps in the feature sub-map sets based on a second branch of the image restoration model; and obtain a restored image according to the first encoding result and the second encoding result.

9. The device according to claim 8, wherein the image restoration model is trained and obtained based on training images, the training images comprise a plurality of similar images, the plurality of similar images comprise a mask image, and the mask image is obtained by masking the similar images.

10. The device according to claim 9, wherein the image restoration model is trained and obtained by:

extracting a training feature map from the training image;

obtaining a first training encoding result by serializing and encoding the training feature map based on the first branch of the image restoration model;

obtaining a second training encoding result by separately encoding training feature sub-map sets obtained by segmenting the training feature map according to different scales and fully connecting encoding results of training feature sub-maps in the training feature sub-map sets based on the second branch of the image restoration model;

restoring the mask image according to the first training encoding result and the second training encoding result; and updating a parameter of the image restoration model according to the restored mask image and the training image prior to masking.

11. The device according to claim 8, wherein the device is configured to:

obtain a search feature of the image to be restored by inputting the image to be restored into a feature comparison model;

acquire, according to the search feature and from an image feature library, a plurality of similar features similar to the search feature; and acquire, according to the plurality of similar features and from the image library, the plurality of similar images of the image to be restored, wherein images in the image library are in one-to-one correspondence with features in the image feature library.

12. The device according to claim 11, wherein the device is configured to:

input the image to be restored into the feature comparison model, obtain a feature map of the image to be restored by down-sampling the image to be restored based on the feature comparison model, and obtain the search feature of the image to be restored by encoding the feature map of the image to be restored based on the feature comparison model.

13. The device according to claim 8, wherein the plurality of similar images and the image to be restored each are images of a same subject at different moments or at different perspectives.

14. The device according to claim 8, wherein the plurality of similar images and the image to be restored are images having a same photographing location.

15. A non-transitory computer-readable storage medium, comprising an instruction, wherein the instruction instructs a device to;

acquire an image to be restored;

determine, from an image library, a plurality of similar images of the image to be restored, wherein the plurality of similar images comprise at least a first similar image and a second similar image; and perform a concat on the image to be restored, the first similar image and the second similar image; input a concatenated image into an image restoration model; obtain a first encoding result by serializing and encoding, based on a first branch of the image restoration model, a feature map extracted from the concatenated image, obtain a second encoding result by separately encoding feature sub-map sets obtained by segmenting the feature map according to different scales and fully connecting encoding results of feature sub-maps in the feature sub-map sets based on a second branch of the image restoration model; and obtain a restored image according to the first encoding result and the second encoding result.

16. The non-transitory computer-readable storage medium according to claim 15, wherein the image restoration model is trained and obtained based on training images, the training images comprise a plurality of similar images, the plurality of similar images comprise a mask image, and the mask image is obtained by masking the similar images.

17. The non-transitory computer-readable storage medium according to claim 16, wherein the image restoration model is trained and obtained by:

extracting a training feature map from the training image;

obtaining a first training encoding result by serializing and encoding the training feature map based on the first branch of the image restoration model;

obtaining a second training encoding result by separately encoding training feature sub-map sets obtained by segmenting the training feature map according to different scales and fully connecting encoding results of training feature sub-maps in the training feature sub-map sets based on the second branch of the image restoration model;

restoring the mask image according to the first training encoding result and the second training encoding result; and updating a parameter of the image restoration model according to the restored mask image and the training image prior to masking.

18. The non-transitory computer-readable storage medium according to claim 15, wherein the device is configured to:

obtain a search feature of the image to be restored by inputting the image to be restored into a feature comparison model;

acquire, according to the search feature and from an image feature library, a plurality of similar features similar to the search feature; and acquire, according to the plurality of similar features and from the image library, the plurality of similar images of the image to be restored, wherein images in the image library are in one-to-one correspondence with features in the image feature library.

19. The non-transitory computer-readable storage medium according to claim 18, wherein the device is configured to:

input the image to be restored into the feature comparison model, obtain a feature map of the image to be restored by down-sampling the image to be restored based on the feature comparison model, and obtain the search feature of the image to be restored by encoding the feature map of the image to be restored based on the feature comparison model.

20. The non-transitory computer-readable storage medium according to claim 15, wherein the plurality of similar images and the image to be restored each are images of a same subject at different moments or at different perspectives.

* * * * *